United States Patent
Husar et al.

(10) Patent No.: US 9,878,850 B2
(45) Date of Patent: Jan. 30, 2018

(54) COLD PLANER FOLDING CONVEYOR

(71) Applicant: Caterpillar Paving Products Inc., Brooklyn Park, MN (US)

(72) Inventors: Lucian M. Husar, Rogers, MN (US); Tim J. Lindholm, Blaine, MN (US)

(73) Assignee: Caterpillar Paving Products Inc., Brookyln Park, MN (US)

( * ) Notice: Subject to any disclaimer, the term of this patent is extended or adjusted under 35 U.S.C. 154(b) by 455 days.

(21) Appl. No.: 14/540,733

(22) Filed: Nov. 13, 2014

(65) Prior Publication Data

US 2016/0137422 A1    May 19, 2016

(51) Int. Cl.
| | |
|---|---|
| *E01C 23/088* | (2006.01) |
| *E01C 23/12* | (2006.01) |
| *E21C 35/20* | (2006.01) |
| *B65G 21/14* | (2006.01) |
| *B65G 21/10* | (2006.01) |
| *B65G 41/00* | (2006.01) |

(52) U.S. Cl.
CPC ............ *B65G 21/10* (2013.01); *B65G 21/14* (2013.01); *B65G 41/002* (2013.01); *E01C 23/088* (2013.01); *E01C 23/127* (2013.01); *E21C 35/20* (2013.01)

(58) Field of Classification Search
CPC ......... E21C 47/00; E21C 35/20; B65G 21/12; B65G 21/10; B65G 21/14; B65G 41/002; E01C 23/088; E01C 23/127
USPC .................................................. 198/632, 313
See application file for complete search history.

(56) References Cited

U.S. PATENT DOCUMENTS

| | | | | |
|---|---|---|---|---|
| 3,616,893 | A * | 11/1971 | Knadle | B65G 21/14 198/632 |
| 4,063,375 | A * | 12/1977 | Satterwhite | E02F 3/18 172/33 |
| 5,086,911 | A | 2/1992 | Douglas | |
| 6,296,109 | B1 | 10/2001 | Nohl | |
| 7,347,311 | B2 | 3/2008 | Rudge | |
| 8,359,695 | B2 * | 1/2013 | Arsenault | E01H 1/042 15/83 |
| 8,424,666 | B2 | 4/2013 | Berning et al. | |
| 2013/0334864 | A1 | 12/2013 | Jorgensen et al. | |
| 2014/0183003 | A1 | 7/2014 | Jorgensen et al. | |
| 2015/0176230 | A1 * | 6/2015 | Berning | E01C 23/127 299/18 |

FOREIGN PATENT DOCUMENTS

GB         2283721 A      5/1995

* cited by examiner

*Primary Examiner* — John J Kreck
*Assistant Examiner* — Michael A Goodwin
(74) *Attorney, Agent, or Firm* — Leydig, Voit & Mayer

(57) ABSTRACT

A foldable conveyor includes a rocker mechanism and actuator coupled to first and second conveyor sections, pivotably connected by a pivotal coupling to pivot the second conveyor section between deployed and stowed positions. The rocker mechanism includes first and second pivotably coupled links pivotably coupled to each other and the first and second conveyor sections, and a mechanical advantage amplifier secured with the first link. The actuator is coupled to the mechanical advantage amplifier such that extension of the actuator moves the second conveyor section to a stowed position below the first conveyor section.

20 Claims, 4 Drawing Sheets

COLD PLANER FOLDING CONVEYOR

TECHNICAL FIELD

This patent disclosure relates generally to cold planer machines and, more particularly to folding mechanisms for folding conveyors associated with cold planer machines.

BACKGROUND

One type of road construction vehicle, commonly referred to as a cold planer machine, generally includes a machine frame and a cutting drum rotatably mounted on the machine frame. The cutting drum facilitates removing material from a roadbed, such as asphalt. The machine also includes a conveyor used for transporting the asphalt to a discharge location such as a truck bed of a dump truck. Typically, the conveyor includes a first conveyor section attached to the main frame and a second conveyor section pivotally connected to the first conveyor section. The conveyor is adapted to be folded for allowing the machine to be transported between job sites. The conveyor is folded by pivotally moving the second conveyor section with respect to the first conveyor section, such that, the second conveyor section is folded from the extended position to a transport position, in other words, from a deployed position to a stowed position.

U.S. Pat. No. 7,347,311 discloses a folding transport conveyor for a construction machine. The conveyor includes two sections that are coupled to pivot by a joint. The '311 patent indicates that the folding mechanism preferably includes two linkages and two actuators. Each linkage includes a drive link and a connector link, the drive link being pivotably connected to the first conveyor section and the connector link, the connector link further being pivotably connected to the second conveyor section. The actuator is coupled to exert a pivoting force at the pivot joint between the drive link and the connector link to fold the second section over and above of the first section.

SUMMARY

The disclosure describes, in one aspect, a foldable conveyor including a first conveyor section, a second conveyor section, a pivotal coupling pivotably connecting, at least one rocker mechanism, and at least one hydraulic cylinder. The first and second conveyor sections each have a distal end, a proximal end, an upper surface and a lower surface. The pivotal coupling pivotably connects the distal end of the first conveyor section with the proximal end of the second conveyor section whereby the second conveyor section may pivot relative to the first conveyor section about the pivotal coupling between a stowed position wherein the second conveyor section is disposed below the lower surface of the first conveyor section, and a deployed position wherein the first and second conveyor sections form a substantially continuous conveyor. The rocker mechanism is coupled to the first and second conveyor sections, and includes a first link, a second link, and a mechanical advantage amplifier. The first link has a first end and a second end; the first end is pivotably coupled to the first conveyor section at a first pivot point. The first pivot point is proximally spaced from the pivotal coupling. The second link has a first end and a second end; the first end is pivotably coupled to the second conveyor section at a second pivot point. The second pivot point is spaced from the lower surface of the second conveyor section. The second end of the first link and the second end of the second link are pivotably coupled at a third pivot point. The mechanical advantage amplifier is connected with the first link and includes a fourth pivot point spaced from an axis connecting the first and second ends of the first link. The hydraulic cylinder has a first end and a second end. The first end of the hydraulic cylinder is pivotably coupled to the first conveyor section proximally the first end of the first link. The second end of the hydraulic cylinder is pivotably coupled to the mechanical advantage amplifier at the fourth pivot point. The second conveyor section is pivotable from the deployed position to the stowed position as the hydraulic cylinder extends.

The disclosure describes in another aspect, a machine including a frame, an implement supported on the frame, and a foldable conveyor. The foldable conveyor includes a first conveyor section, a second conveyor section, a pivotal coupling pivotably connecting, at least one rocker mechanism, and at least one hydraulic cylinder. The first and second conveyor sections each have a distal end, a proximal end, an upper surface and a lower surface. The pivotal coupling pivotably connects the distal end of the first conveyor section with the proximal end of the second conveyor section whereby the second conveyor section may pivot relative to the first conveyor section about the pivotal coupling between a stowed position wherein the second conveyor section is disposed below the lower surface of the first conveyor section, and a deployed position wherein the first and second conveyor sections form a substantially continuous conveyor. The rocker mechanism is coupled to the first and second conveyor sections, and includes a first link, a second link, and a mechanical advantage amplifier. The first link has a first end and a second end; the first end is pivotably coupled to the first conveyor section at a first pivot point. The first pivot point is proximally spaced from the pivotal coupling. The second link has a first end and a second end; the first end is pivotably coupled to the second conveyor section at a second pivot point. The second pivot point is spaced from the lower surface of the second conveyor section. The second end of the first link and the second end of the second link are pivotably coupled at a third pivot point. The mechanical advantage amplifier is connected with the first link and includes a fourth pivot point spaced from an axis connecting the first and second ends of the first link. The hydraulic cylinder has a first end and a second end. The first end of the hydraulic cylinder is pivotably coupled to the first conveyor section proximally the first end of the first link. The second end of the hydraulic cylinder is pivotably coupled to the mechanical advantage amplifier at the fourth pivot point. The second conveyor section is pivotable from the deployed position to the stowed position as the hydraulic cylinder extends.

BRIEF DESCRIPTION OF THE DRAWING(S)

DETAILED DESCRIPTION

Figure 1:
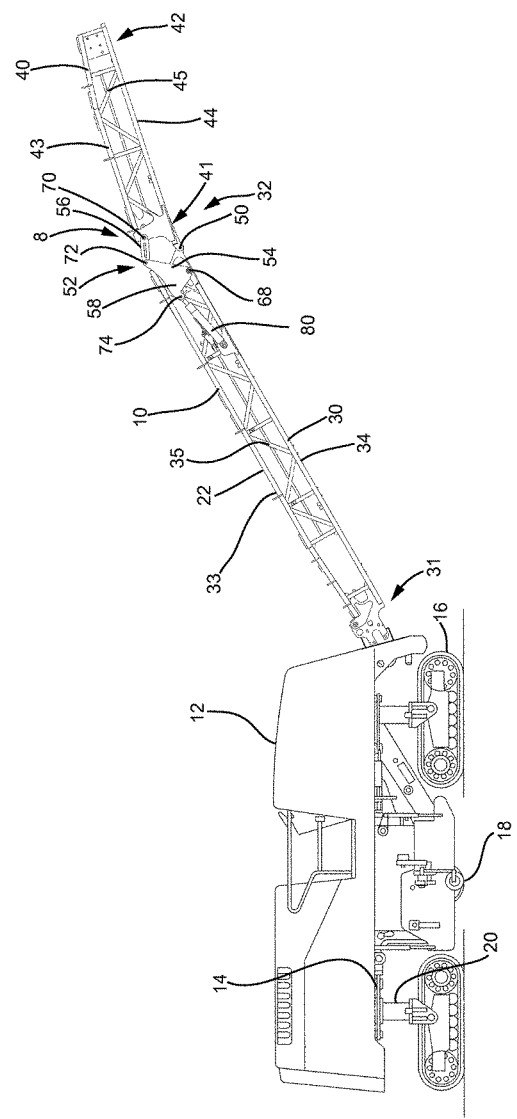
FIG. 1 illustrates a side elevational view of an exemplary machine having a foldable conveyor, according to one embodiment of the present disclosure.

This disclosure relates to a conveyor folding mechanism 8 for use with a folding conveyor 10 of an exemplary machine 12, such as the machine 12 schematically illustrated in FIG. 1. While the machine 12 is illustrated as a cold planer machine, the folding mechanism 8 may be utilized in connection with any machine including a folding conveyor 10, such as an alternate machine 12 used, for example, in the art of construction.

The machine 12 includes a frame 14 supported on a plurality of movers, such as the illustrated drive tracks 16 configured for propelling the machine 12 along a road surface. The machine 12 also includes an implement 18, such as a cutting drum, supported on the frame 14. The implement 18 may be utilized in milling the road surface. A cutting plane of the machine 12 is tangent to the bottom of the implement 18 and parallel to the direction of travel of the machine 12. The drive tracks 16 of the machine 12 are connected to the frame 14 of the machine 12 by hydraulic legs 20. The hydraulic legs 20 are configured to raise and lower the implement 18 relative to the drive tracks 16 so as to control a depth of cut for the implement 18.

The machine 12 is further equipped with a foldable conveyor 10 configured to transport excavated asphalt from the machine 12 to a discharge location, such as the bed of a dump truck (not illustrated). For example, the foldable conveyor 10 may be equipped with a conveyor belt (illustrated generally as 22) rotating around the foldable conveyor 10 facilitating transport of excavated asphalt to the discharged location.

The foldable conveyor 10 includes a first conveyor section 30 and a second conveyor section 40. The first conveyor section 30 and the second conveyor section 40 include proximal ends 31, 41 and distal ends 32, 42, respectively. Both of the first and second conveyor sections 30, 40 additionally include upper surfaces 33, 43, lower surfaces 34, 44, first sides 35, 45, and second sides (not visible in the figures, but disposed opposite the first sides 35, 45, respectively). The proximal end 31 of the first conveyor section 30 is coupled to the frame 14 of the machine 12, such that, the first conveyor section 30 may be articulated about the frame 14. The distal end 32 of the first conveyor section 30 is pivotally connected to the proximal end 41 of the second conveyor section 40. For example, a pivotal coupling 50 between the first conveyor section 30 and the second conveyor section 40 allows the second conveyor section 40 to articulate about the first conveyor section 30. The pivotal coupling 50 may be of any appropriate design, such as, for example, a pivot rod and corresponding apertures.

Figure 2:
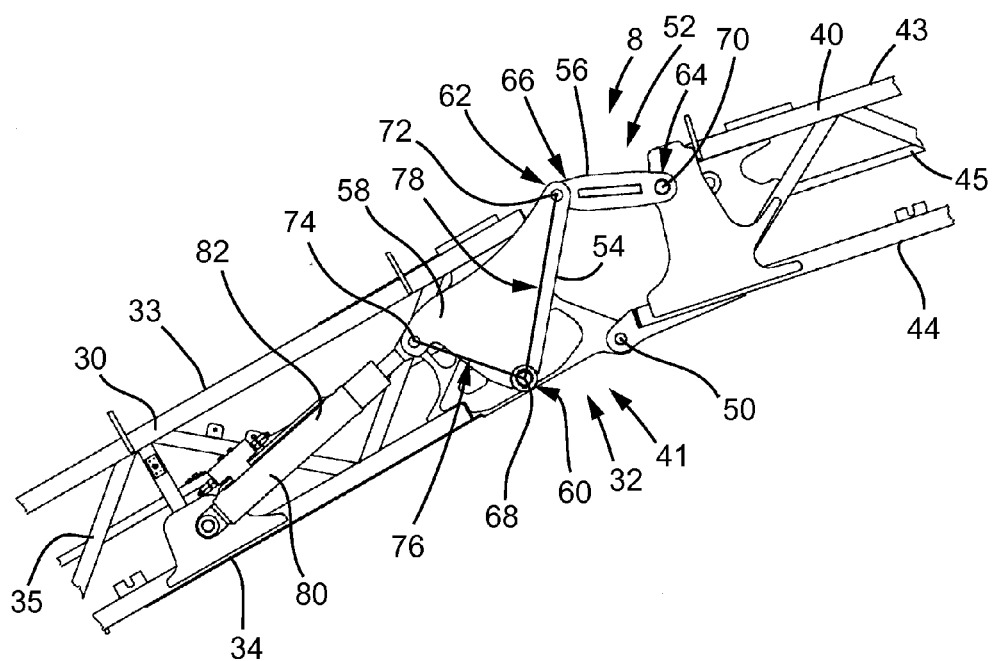
FIG. 2 illustrates an enlarged fragmentary side view of a portion of the foldable conveyor in a deployed position.
Figure 4:
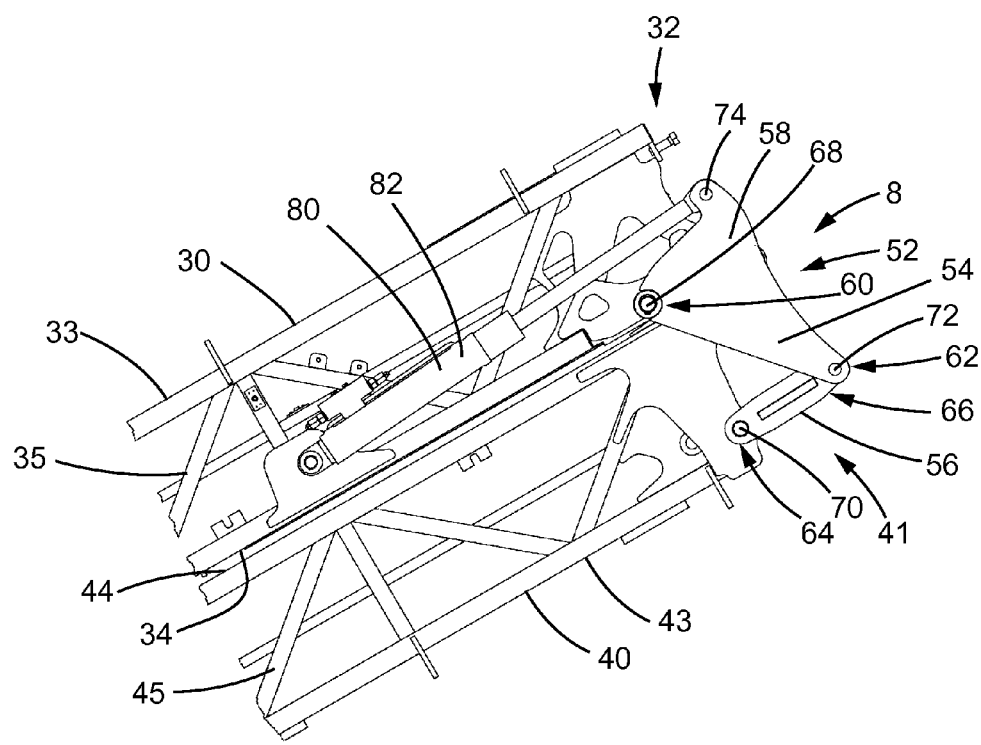
FIG. 4 illustrates an enlarged fragmentary side view of the portion of the foldable conveyor shown in FIGS. 2 and 3 in a stowed position.

The foldable conveyor 10 also includes a conveyor folding mechanism 8, which includes at least one rocker mechanism 52, which, along with portions of the first and second conveyor sections 30, 40 provides a four-bar linkage arrangement to facilitate movement of the second conveyor section 40 about the pivotal coupling 50. The rocker mechanism 52 is coupled to the first conveyor section 30 and the second conveyor section 40. The rocker mechanism 52 facilitates movement of the foldable conveyor 10 to both the deployed position (when the foldable conveyor 10 forms a substantially continuous conveyor) and the stowed position (when the foldable conveyor 10 is not in use). As shown in FIGS. 1 and 2, the foldable conveyor 10 is in the deployed position, in which, the first conveyor section 30 and the second conveyor section 40 are positioned in an extended state, that is, a substantially linear state. In the illustrated embodiment, the pivotal coupling 50 is disposed substantially along the lower surfaces 34, 44 of the first and second conveyor sections 30, 40. As a result, when the foldable conveyor 10 is disposed with the second conveyor section 40 in the stowed position (illustrated in FIG. 4), the second conveyor section 40 is disposed below the first conveyor section 30. Those of skill will further appreciate that positioning of the pivotal coupling 50 such that the second conveyor section 40 pivots about a point substantially along the lower surfaces 34, 44, as in the illustrated embodiment, the second conveyor section 40 in the stowed position will be disposed with the lower surfaces 34, 44 substantially adjacent. In the stowed position, the first and second conveyor sections 30, 40 can be further coupled together if desired (not illustrated).

The rocker mechanism 52 includes a first link 54, a second link 56, and a mechanical advantage amplifier 58. The first link 54 includes a first end 60 and a second end 62. Similarly, the second link 56 includes a first end 64 and a second end 66.

The first end 60 of the first link 54 is pivotably coupled to the first conveyor section 30 at a first pivot point 68. The first pivot point 68 is disposed proximally from the pivotal coupling 50, and, in the illustrated embodiment, likewise substantially along the lower surface 34 of the first conveyor section 30. For the purposes of this disclosure, the terms "proximal" and "proximally" indicate a direction or location toward the machine 12 as illustrated in FIG. 1, while the terms "distal" and "distally" indicate a direction or location away from the machine 12 as illustrated in FIG. 1.

The first end 64 of the second link 56 is pivotably coupled to the second conveyor section 40 at a second pivot point 70. The second pivot point 70 is spaced from the lower surface 44 of the second conveyor section 40, and, in the illustrated embodiment, distally from the pivotal coupling 50 and toward the upper surface 43 of the second conveyor section 40.

The second ends 62, 66 of the first and second links 54, 56 are pivotably coupled at a third pivot point 72. In this way, the first and second links 54, 56 and portions of the first and second conveyor sections 30, 40 form a four-bar linkage. More specifically, the first conveyor section 30 between the pivotal coupling 50 and the first pivot point 68, the first link 54, the second link 56, and the second conveyor section 40 between the second pivot point 70 and the pivotal coupling 50 form the four bars of a four-bar linkage. Those of skill in the art will appreciate that the four-bar linkage may be, for example, a so-called Grashof double rocker four bar mechanism.

In order to facilitate control of the four-bar linkage, the rocker mechanism 52 further includes the mechanical advantage amplifier 58. The mechanical advantage amplifier 58 is connected or secured with the first link 54. It will be appreciated that the mechanical advantage amplifier 58 may be unitarily formed with the first link 54. In the illustrated embodiment, for example, the mechanical advantage amplifier 58 and the first link 54 are formed as a triangularly shaped plate.

The mechanical advantage amplifier 58 includes a fourth pivot point 74, which is spaced from the first link 54, that is, an axis connecting the first and third pivot points 68, 72. Referring to FIG. 2, the fourth pivot point 74 is spaced a first distance 76 from the first pivot point 68, while the third pivot point 72 is spaced a second distance 78 from the first pivot point 68. In the illustrated embodiment, the second distance 78 is greater than the first distance 76. In this way, a pivoting movement of the fourth pivot point 74 about the first pivot point 68 likewise results in a pivoting movement of the third pivot point 72 about the first pivot point 68, and movement of the second link 56, and coupled second conveyor section 40.

In order to facilitate movement of the rocker mechanism 52, the conveyor folding mechanism 8 further includes at least one actuator 80 coupled to the mechanical advantage amplifier 58 at the fourth pivot point 74. The actuator 80 may be selectively actuated, applying a force at the fourth pivot point 74 to provide pivoting movement of the rocker mechanism 52, and, accordingly, the second conveyor section 40. While the actuator 80 may be of any appropriate design, the actuator 80 of the illustrated embodiment is a hydraulic cylinder 82. The hydraulic cylinder 82 is pivotally coupled at one end to the fourth pivot point 74, and pivotally coupled at the other end to the first conveyor section 30.

Figure 3:
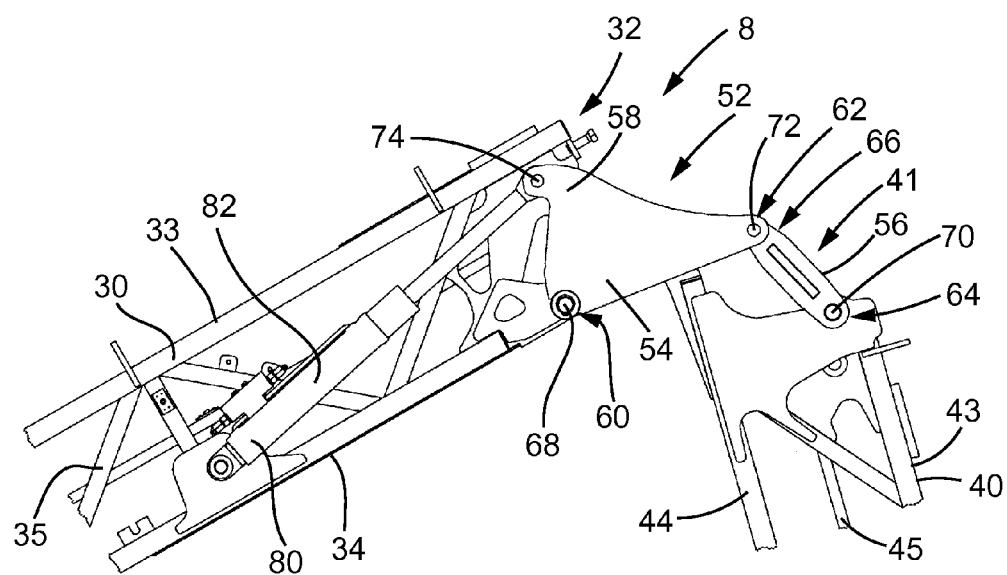
FIG. 3 illustrates an enlarged fragmentary side view of the portion of the foldable conveyor shown in FIG. 2 in an intermediate position.

The hydraulic cylinder 82 may be selectively filled or emptied to provide resulting motion of the rocker mechanism 52. More specifically, the hydraulic cylinder 82 may be filled to extend the hydraulic cylinder 82 and pivot the rocker mechanism 52 to pivot the second conveyor section 40 about the pivotal coupling 50 from a deployed or extended position, such as is illustrated in FIG. 2, through the mid-position illustrated in FIG. 3, to the stowed position illustrated in FIG. 4. Conversely, the hydraulic cylinder 82 may be selectively emptied to retract the hydraulic cylinder 82, exerting a retraction force to pivot the rocker mechanism 52 from the stowed position illustrated in FIG. 4, through the mid-position illustrated in FIG. 3, to the deployed position illustrated in FIG. 2.

The rocker mechanism 52 is laterally positioned and coupled to the first sides 35, 45 of the first conveyor section 30 and the second conveyor section 40, respectively. The actuator 80, here, the hydraulic cylinder 82, is likewise coupled to the first side 35 of the first conveyor section 30.

It will be appreciated that the foldable conveyor 10 also includes another rocker mechanism (not shown), such as the rocker mechanism 52, and an actuator, such as actuator 80, laterally positioned on the opposite sides of the first and second conveyor sections 30, 40.

INDUSTRIAL APPLICABILITY

The present disclosure is applicable to folding conveyors 10, such as a folding conveyor of a cold planer machine 12; the folding conveyor 10 may likewise be utilized in connection with other machines 12 that require transport of the machine 12 and conveyor 10 between locations.

The disclosure provides a reliable structure for pivoting the second conveyor section 40 relative to the first conveyor section 30 to move the second conveyor section 40 between deployed and stowed positions.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

We claim:

1. A foldable conveyor comprising:
   a first conveyor section having a distal end, a proximal end, an upper surface and a lower surface;
   a second conveyor section having a distal end, a proximal end, an upper surface, and a lower surface;
   a pivotal coupling pivotably connecting the distal end of the first conveyor section with the proximal end of the second conveyor section whereby the second conveyor section pivots relative to the first conveyor section about the pivotal coupling between a stowed position wherein the second conveyor section is disposed below the lower surface of the first conveyor section, and a deployed position wherein the first and second conveyor sections form a continuous conveyor;
   at least one rocker mechanism coupled to the first and second conveyor sections, the rocker mechanism including
   a first link having a first end and a second end, the first end being pivotably coupled to the first conveyor section at a first pivot point, the first pivot point being proximally spaced from the pivotal coupling,
   a second link having a first end and a second end, the first end being pivotably coupled to the second conveyor section at a second pivot point, the second pivot point being spaced from the lower surface of the second conveyor section, the second end of the first link and the second end of the second link being pivotably coupled at a third pivot point, and
   a mechanical advantage amplifier connected with the first link and including a fourth pivot point spaced from an axis connecting the first and second ends of the first link; and
   at least one actuator pivotably coupled to the mechanical advantage amplifier at the fourth pivot point, the second conveyor section being pivotable from the deployed position to the stowed position as the actuator is actuated.

2. The foldable conveyor of claim 1 wherein the actuator is a hydraulic cylinder having a first end and a second end, the first end being pivotably coupled to the first conveyor section proximally the first end of the first link, the second end of the hydraulic cylinder being pivotably coupled to the mechanical advantage amplifier at the fourth pivot point, the second conveyor section being pivotable from the deployed position to the stowed position as the hydraulic cylinder extends.

3. The foldable conveyor of claim 1 wherein the lower surfaces of the first and second conveyor sections are disposed parallel to one another when the second conveyor section is disposed in the stowed position.

4. The foldable conveyor of claim 3 wherein the pivotal coupling is disposed adjacent the lower surfaces of the first and second conveyor sections.

5. The foldable conveyor of claim 4 wherein the first link and the mechanical advantage amplifier are formed as a unitary triangularly shaped plate, and the second pivot point is spaced distally from the pivotal coupling.

6. The foldable conveyor of claim 1 wherein the first link and the mechanical advantage amplifier are formed as a unitary part.

7. The foldable conveyor of claim 6 wherein the unitary part is a triangularly shaped plate.

8. The foldable conveyor of claim 1 wherein the second pivot point is spaced distally from the pivotal coupling.

9. The foldable conveyor of claim 1 wherein the second pivot point is located adjacent the upper surface.

10. The foldable conveyor of claim 1 wherein the second pivot point is located on an upper portion of the second conveyor section.

11. The foldable conveyor of claim 10 wherein the first pivot point is located on the lower surface of the first conveyor section.

12. The foldable conveyor of claim 11 wherein the first and second conveyor sections are disposed parallel to one another when the second conveyor section is disposed in the stowed position.

13. A foldable conveyor comprising:
a first conveyor section having a distal end, a proximal end, an upper surface and a lower surface;
a second conveyor section having a distal end, a proximal end, an upper surface, and a lower surface;
a pivotal coupling disposed adjacent the lower surfaces of the first and second conveyor sections, the pivotal coupling pivotably connecting the distal end of the first conveyor section with the proximal end of the second conveyor section whereby the second conveyor section may pivot relative to the first conveyor section about the pivotal coupling between a stowed position wherein the second conveyor section is disposed below and adjacent the lower surface of the first conveyor section, and a deployed position wherein the first and second conveyor sections form a continuous conveyor;
at least one rocker mechanism coupled to the first and second conveyor sections, the rocker mechanism including
a first link having a first end and a second end, the first end being pivotably coupled to the first conveyor section at a first pivot point, the first pivot point being proximally spaced from the pivotal coupling,
a second link having a first end and a second end, the first end being pivotably coupled to the second conveyor section at a second pivot point, the second pivot point being spaced from the lower surface of the second conveyor section, the second end of the first link and the second end of the second link being pivotably coupled at a third pivot point, and
a mechanical advantage amplifier connected with the first link and including a fourth pivot point spaced from an axis connecting the first and second ends of the first link; and
first and second hydraulic cylinders, each hydraulic cylinder having a first end and a second end, the first end being pivotably coupled to the first conveyor section proximally the first end of the first link, the second end of the hydraulic cylinder being pivotably coupled to the mechanical advantage amplifier at the fourth pivot point, the second conveyor section being pivotable from the deployed position to the stowed position as the hydraulic cylinder extends.

14. The foldable conveyor of claim 13 wherein the first link and the mechanical advantage amplifier are formed as a unitary, triangularly shaped plate.

15. The foldable conveyor of claim 13 wherein the second pivot point is spaced distally from the pivotal coupling.

16. A cold planer comprising:
a frame;
an implement supported on the frame;
a foldable conveyor coupled to the frame and including:
a first conveyor section having a distal end, a proximal end, an upper surface and a lower surface;
a second conveyor section having a distal end, a proximal end, an upper surface, and a lower surface;
a pivotal coupling pivotably connecting the distal end of the first conveyor section with the proximal end of the second conveyor section whereby the second conveyor section may pivot relative to the first conveyor section about the pivotal coupling between a stowed position wherein the second conveyor section is disposed below the lower surface of the first conveyor section, and a deployed position wherein the first and second conveyor sections form a continuous conveyor;
at least one rocker mechanism coupled to the first and second conveyor sections, the rocker mechanism including:
a first link having a first end and a second end, the first end being pivotably coupled to the first conveyor section at a first pivot point, the first pivot point being proximally spaced from the pivotal coupling,
a second link having a first end and a second end, the first end being pivotably coupled to the second conveyor section at a second pivot point, the second pivot point being spaced from the lower surface of the second conveyor section, the second end of the first link and the second end of the second link being pivotably coupled at a third pivot point, and
a mechanical advantage amplifier connected with the first link and including a fourth pivot point spaced from an axis connecting the first and second ends of the first link; and
at least one actuator pivotably coupled to the mechanical advantage amplifier at the fourth pivot point, the second conveyor section being pivotable from the deployed position to the stowed position as the actuator is actuated.

17. The cold planer of claim 16 wherein the first link and the mechanical advantage amplifier are formed as a unitary part.

18. The cold planer of claim 17 wherein the unitary part is a triangularly shaped plate.

19. The cold planer of claim 16 wherein the second pivot point is spaced distally from the pivotal coupling.

20. The cold planer of claim 16 wherein the implement is a cutting drum, and further including a plurality of drive tracks adapted to propel the frame, and a plurality of hydraulic legs adapted to raise and lower the cutting drum relative to the drive tracks.

* * * * *